Patented July 4, 1944

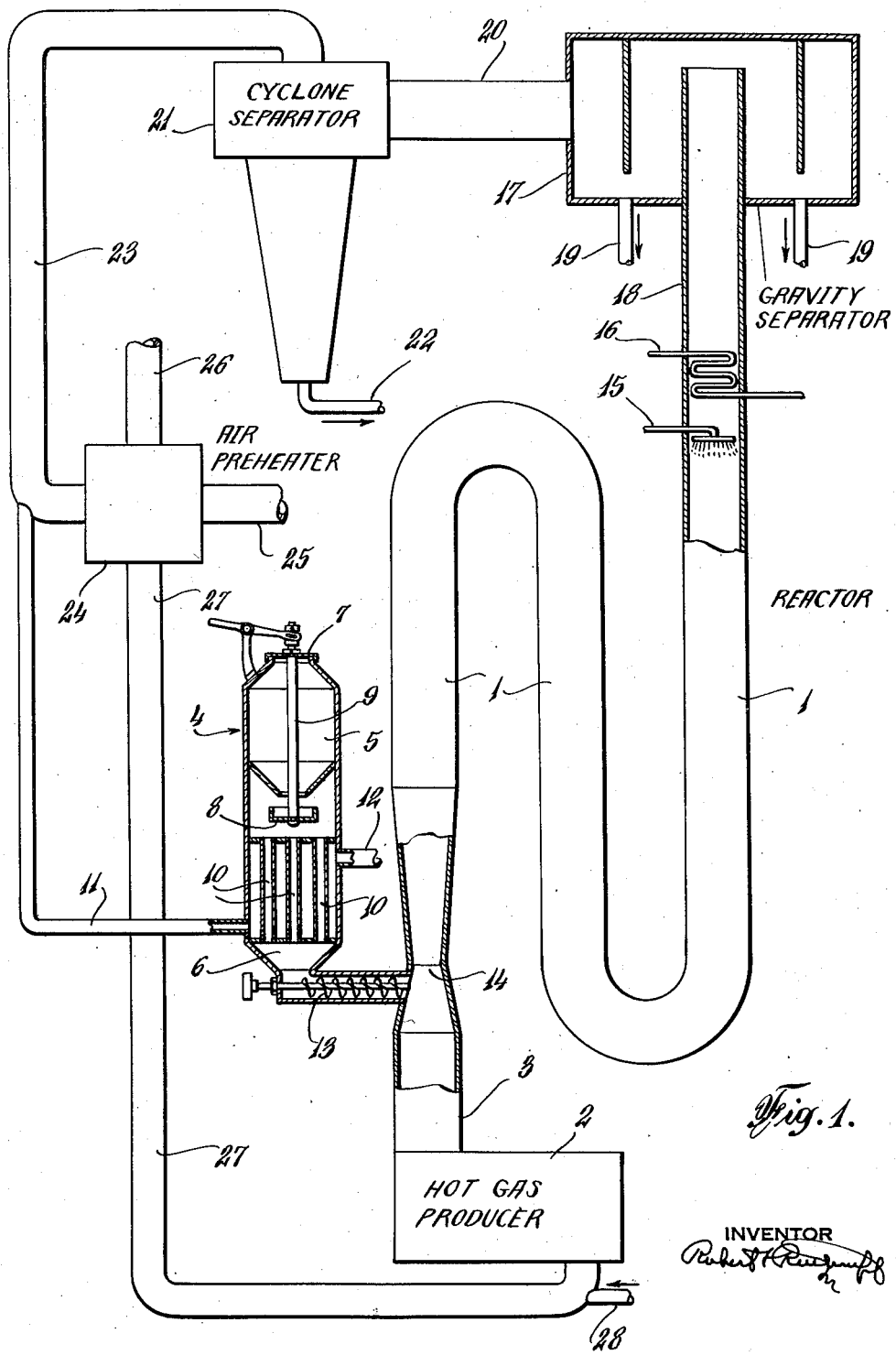

2,352,738

UNITED STATES PATENT OFFICE 2,352,738

MANUFACTURE OF ALKALI METAL SILICATES

Robert F. Ruthruff, Chicago, Ill.

Application January 15, 1940, Serial No. 313,900

5 Claims. (Cl. 23—110)

This invention relates to the manufacture of alkali metal silicates and means therefor. More particularly, this invention relates to the method and means for the manufacture of alkali metal silicates wherein mixtures comprising siliceous material and an alkali metal compound are suspended in a moving stream of heated gas under the conditions necessary and for a period sufficient for interaction to occur with the formation of alkali metal silicates. More specifically, this invention relates to the manufacture of sodium silicates and means therefor. Still more specifically, this invention relates to the method and means for the manufacture of sodium silicates wherein mixtures comprising siliceous material and a sodium compound are suspended in a moving stream of heated gas under the conditions necessary and for a period sufficient for interaction to occur with the formation of sodium silicates.

The many uses of the alkali metal silicates, solutions of which in water are commonly referred to as water glass, are too familiar to require exposition. These alkali metal silicates may be formed in a variety of ways, but only two methods of preparation have achieved lasting commercial success, these being (a) the fusion of a mixture of alkali metal carbonate and a suitable siliceous material at elevated temperatures, for example, 2400° to 2700° F., and (b) the fusion of a mixture of alkali metal sulfate, a suitable siliceous material and a reducing agent, usually carbon, at elevated temperatures, for example, 2000° to 2700° F. In commercial practice, the alkali metal oxide-silica ratios of the product range from say 1:1 to 1:4.2 (mole basis), although somewhat wider variations are possible should there be any demand for products outside the range quoted. One of the most common varieties of alkali metal silicates is a sodium silicate having a sodium oxide-silica ratio of 1:3.4 (mole basis) or 1:3.22 (weight basis). To manufacture this material by the processes outlined, the following theoretical equations may be written:

(a) $Na_2CO_3 + 3.4SiO_2 \rightarrow Na_2O \cdot 3.4SiO_2 + CO_2$ (b) $Na_2SO_4 + \frac{1}{2}C + 3.4SiO_2 \rightarrow$
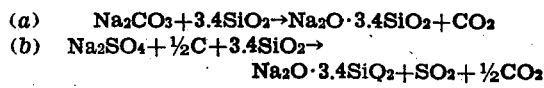
$Na_2O \cdot 3.4SiO_2 + SO_2 + \frac{1}{2}CO_2$ The above fusion reactions are usually conducted batchwise in open hearth regenerative type furnaces, but reverberatory furnaces may be used. Clay refractories are usually employed. The attack of the refractories by the fusion mixture is very severe, this being especially true in the alkali metal sulfate-silica-carbon process. In both reactions, due to the large amount of silica in the fusion mixture, basic refractories are rapidly destroyed while the silica-alkali metal oxide equilibrium is such that siliceous refractories fail with almost equal rapidity. To overcome these difficulties, in some installations, the refractories are cooled. While this cuts down refractory destruction to a considerable extent, it is obvious that this is accomplished only through an appreciable sacrifice in overall heat economy.

The alkali metal silicates prepared by the methods described above are obtained in the form of large glassy lumps. Before use these are usually dissolved in water to form the water glasses of commerce. The dissolving step is quite troublesome. If an attempt is made to dissolve these lumps in water, the sodium oxide is preferentially removed from the solid, which as a result becomes coated with an impervious layer of hydrated silica, which prevents or hinders further solution. The solid alkali metal silicate dissolves rather rapidly in an aqueous solution of alkali metal silicate, but here extreme care must be taken or the solution and solid will unite and fill the dissolving vessel with a tough solid that is almost impossible to remove. Usually, in dissolving solid alkali metal silicates, a solution of alkali metal silicates is used. A portion of the solution is withdrawn continuously or from time to time while an equivalent amount of water is added to the dissolving vessel. In this way solution occurs in a liquid medium sufficiently concentrated in solute to prevent hydrolysis of the solute but insufficiently concentrated in solute to enable the solution and solid to combine to form a solid mass in the dissolving vessel.

One object of this invention is to provide an improved process and means for the preparation of alkali metal silicates. A further object of this invention is to provide a continuous process for the preparation of alkali metal silicates and a suitable apparatus therefor. Another object of this invention is to provide a process and means for the production of alkali metal silicates wherein destruction of furnace refractories is at a minimum. An additional object of this invention is to provide a process and means for the preparation of alkali metal silicates in such a physical form that solution of the product in water is facilitated. Other objects of this invention will be evident from the description thereof included herein.

Briefly stated, in the present invention, mixtures of materials capable of interacting at elevated temperatures, either of themselves of in the presence of a reducing agent, with the formation of alkali metal silicates are suspended in a moving stream of heated gas for a period sufficient for such interaction to occur. For example, aggregates comprising an intimate mixture of alkali metal carbonate and a suitable siliceous material may be added to a moving stream of highly heated gas and after the desired reaction has occurred the resulting particles of alkali metal silicate may be separated from the moving gas stream by known means. Or, aggregates comprising an intimate mixture of alkali metal sulfate, a suitable siliceous material and a reducing agent may be added to a moving stream of highly heated gas and after the desired reaction has occurred the resulting particles of alkali metal silicate may be separated from the gas stream by known means. In this last modification the reducing action may be furnished by the heated gas stream if desired.

For a better understanding of the instant invention reference may be had to the single figure, which is a diagrammatic representation, partly in section and partly in elevation, of a suitable apparatus for carrying out the process of this invention.

In Figure 1, numeral 1 designates a reactor suitable for the purposes of this invention. It will be observed that this reactor takes the form of an elongated conduit having a sinuous conformation. The exact form and conformation of the reactor are largely matters of choice; in the present instance the particular conformation selected was chosen for the purpose of keeping the height of the reactor within reasonable limits. In the particular embodiment pictured, the reactor 1 is supplied with hot gases from hot gas producer 2, which are introduced into the reactor 1 through line 3. Hot gas producer 2 is so constructed as to enable combustion to proceed therein at moderately elevated pressures, for example, pressures in the neighborhood of 45 pounds per square inch if desirable or necessary.

Solid reactants are held in hopper or bin 4, which is most conveniently divided into an upper portion 5 and a lower portion 6, so arranged that when communication between 5 and 6 is closed 5 is open to the atmosphere, and when 5 and 6 are in communication 5 is closed to the atmosphere. This may be accomplished, for example, by means of valves 7 and 8 mounted on valve stem 9. When these valves are lowered (as shown in Figure 1) communication between 5 and 6 is established but 5 is closed to the atmosphere. When valves 7 and 8 are raised, communication between 5 and 6 is cut off while 5 is open to the atmosphere. By such means with the valves in the raised position it is possible to fill 5 with solid reactants without danger of a blow back of gases from reactor 1 to the atmosphere. With the valves in the lowered position (shown in Figure 1), solid reactants in 5 may pass to 6, again without danger of blow back. Preferably, means are provided for heating the solid reactants in bin of hopper 4. In Figure 1, this heating means takes the form of a tubular heat exchanger in 6. Solid reactants flow through the tubes 10 in this exchanger while the tubes themselves are surrounded by suitable heated fluid entering through line 11 and leaving through line 12.

Solid reactants are moved from hopper or bin 4 by means of screw conveyor 13 or other similar suitable device and are thereby conveyed to reactor 1. By using a properly designed screw conveyor, it is not absolutely essential to divide bin or hopper 4 into upper and lower sections 5 and 6 separated by valve 8. Properly designed screw conveyors are able to seal against appreciable pressure so that 13 acts to prevent blow backs from reactor 1 through hopper 4. However, as a safety precaution, it is well to design hopper or bin 4 as described or in a similar fashion. If desired, solid reactants may be discharged by screw 13 into a Venturi throat 14 disposed in reactor 1. By this means suspension of the solid reactants in the gases entering through 3 is greatly facilitated.

The suspension of solid reactants in the gases entering through line 3 passes through reactor 1 in which reaction occurs. The reaction products leaving reactor 1 are in a highly heated condition and should be cooled appreciably before being worked up. This may be accomplished by any suitable means, for example by spraying water into the suspension through line 15 or by passing the suspension over coils 16 through which water is flowing or both.

Reaction products are now separated from the partially cooled suspension. This separation is usually accomplished in two steps. A rough separation occurs in the first, while the greater part of the remaining reaction products is removed in the second. Any suitable separation means may be employed. In Figure 1 the use of a gravity separator and a cyclone separator in series is shown, but other separation means, for example Cottrell precipitators, may be used. In Figure 1, the partially cooled suspension is shown passing to gravity separator 17 through line 18. In gravity separator 17, the velocity of the suspension is much reduced and the direction of flow is changed several times. Separated solids may be removed through lines 19. Partially separated suspension is sent from gravity separator 17 through line 20 to cyclone separator 21, where practically complete removal of solid reaction products occurs, these being removed through line 22.

The practically solid-free gas leaves cyclone separator 21 through line 23 and passes to air preheater 24, leaving through line 25. Part of the stream in line 23 may be diverted through line 11 to preheat solid reactants as previously described. Air enters air preheater 24 through line 26 and leaves through line 27, passing to hot gas generator 2. If desired, this air may be under low superatmospheric pressure, for example up to 45 pounds per square inch. If desired or necessary, a suitable amount of gaseous, liquid or solid fuel may be introduced into the preheated air stream via line 28, this fuel then being partially or completely burned in hot gas producer 2.

As the suspension leaving reactor 1 contains appreciable sensible heat, it is advisable to recover as much of this as possible in the form of useful work. This may be done in a number of ways. For example, large amounts of steam may be generated in coil 16. Also, the hot gas may be used to drive a turbine, although it is preferably used for this purpose only after the solids suspended therein have been removed. As shown in Figure 1, part of the heat content of the gas is recovered and used to preheat air while another part is devoted to preheating the solid reactants.

As temperature conditions are very severe in hot gas producer 2 and reactor 1, these must be constructed with this in mind. It has been found that an inner layer of high grade refractory brick backed by two layers of fire brick of high insulating value, the whole being surrounded with sheet steel, constitutes an economic and satisfactory method for constructing hot gas generator 2 and reactor 1. Line 15 and coil 16 are preferably made from 18–8 or similar high temperature alloy steel. The remaining parts of the apparatus may be constructed from alloy steel or ordinary mild steel.

While the reactor shown in Figure 1 consists of an elongated conduit of sinuous form having three legs in which the reactants first pass upward, then downward and then upward again, this particular conformation is illustrative only and in no way limits the scope of the invention. The number of legs possessed by the reactor and the direction of flow therein are immaterial. For example, instead of the reactor shown, equally satisfactory results are obtained with reactors having one, two, four or more legs. Also, it is not necessary to introduce the reactants into an ascending leg of the reactor. Reactants, if desired, may be introduced into the upper portion of a descending leg and such reactors may again have one or more legs. Also, while in Figure 1 the reactor is shown disposed vertically, equally satisfactory results have been obtained using horizontal reactors or reactors with alternating vertical and horizontal legs.

Figure 1 and the above description relating thereto cover one embodiment of an apparatus suitable for the present invention. Further details, including quantities, temperatures, rates and the like, as well as a few of the many possible modifications of the apparatus shown and described will be outlined in the five examples to follow.

Example 1

Finely divided siliceous material, for example, diatomaceous earth flour, is made into a thick but uniform paste with a strong solution of sodium carbonate. For each 100 pounds of siliceous material used about 52 pounds of sodium carbonate are employed. The paste is evaporated to dryness, is crushed and charged to hopper or bin 4 of a semi-commercial unit similar to that shown in Figure 1. A natural gas comprising essentially methane is charged to the hot gas producer 2 through line 28 at a rate of about 16 cubic feet per minute. In this modification of the general method for producing alkali metal silicates, the hot gas stream may be inert, oxidizing or reducing in its action. For heat economy an inert hot gas stream is used; that is, the theoretical amount of air is added to hot gas producer 2 through line 27. The hydrocarbon gas is burned in a suitable burner. Circulation is continued without the introduction of solid reactants until the whole system is brought up to temperature, at which time screw 13 is started and the mixture of siliceous material and sodium carbonate is introduced into the reactor at a rate of about 13.5 pounds per minute. Conditions are so regulated that the temperature in cyclone separator 21 is somewhat above 1000° F., while the temperature of the air in line 27 and the solid introduced into reactor 1 is somewhat above 850° F. As far as can be measured, the temperature in reactor 1 varies between 2400° F. and 2700° F., but little reliance can be placed on these determinations. Finely divided sodium silicates are removed through lines 19 and 22 at a total rate of almost 12 pounds per minute. The loss of sodium silicates is about 0.5 pound per hour. The reactor employed had a cross sectional area of one square foot.

Example 2

One hundred parts by weight of finely divided siliceous matter, for example diatomaceous earth flour, is made into a thick but uniform paste with a strong solution containing 70 parts by weight of sodium sulfate. The resulting paste is dried and is crushed and mixed with about 24 parts by weight of the petroleum fraction representing 20% bottoms from Mid-Continent crude and having an A. P. I. gravity of 17.6°. The resulting mixture is heated in an inert atmosphere to drive off all volatile matter and the dry product is crushed and charged into hopper or bin 4 of an apparatus similar to that shown in Figure 1. A natural gas comprising essentially methane is charged at a rate of 8 cubic feet per minute, through line 28, to the hot gas producer 2. In this modification of the general method for producing alkali metal silicates, the hot gas stream may be inert or reducing in its action. For heat economy it is advisable to operate using the theoretical amount of air providing that combustion is perfect; otherwise a slight deficiency of air should be used to insure that the hot combustion gases contain no oxygen. Air is added to hot gas producer 2 through line 27 to burn the methane. Hot gas circulation is continued without introduction of solid reactants until the whole system is brought up to reaction temperature, at which time screw 13 is started and the siliceous material-sodium sulfate-carbon mixture is introduced into the reactor at a rate of about 5 pounds per minute. Temperatures are similar to those described in Example 1. Product is removed from lines 19 and line 22 at a total rate of a little above 3.5 pounds per minute.

Example 3

In this example, as the hot gas is produced autogenously, hot gas producer 2 is not required except perhaps initially when it is preferably used to bring the whole apparatus up to temperature. If desired, a bypass between line 27 and line 3 may be constructed so as to short circuit hot gas producer 2 when temperature has been achieved. A mixture of siliceous material and soda ash is prepared as described in Example 1 and, after drying, petroleum coke is added at a rate of 8 pounds per 100 pounds of siliceous material-sodium carbonate mixture, the whole then being mixed and pulverized and added to hopper or bin 4 of an apparatus similar to that shown in Figure 1. The whole apparatus is brought up to temperature by burning fuel in hot gas producer 2, following which this is gradually discontinued, solid reactants being simultaneously cut into reactor 1 by starting screw 13 while preheated air is added to line 3 from line 27, either directly by a bypass (not shown) or via hot gas producer 2. Under settled conditions solid reactants are added to reactor 1 at a rate of about 15.5 pounds per minute while preheated air is added to line 3 at a rate of 185 cubic feet per minute, measured at standard conditions. Temperatures are similar to those described in Example 1. Alkali metal silicates are removed from lines 19 and line 22 at a total rate of about 12.5 pounds per minute.

Example 4

Again in this example the hot gas is produced autogenously, so that hot gas producer 2 of Figure 1 is not required except perhaps initially when it is preferably used to bring the whole apparatus up to temperature. If desired, a bypass between line 27 and line 3 may be used to short circuit hot gas producer 2 when temperature has been achieved. A mixture of siliceous material and sodium sulfate is prepared in the proportions specified in Example 2. To 100 parts by weight of the dried mixture are added 12 pounds of carbon, for example petroleum coke. The whole is pulverized and charged to hopper or bin 4 of an apparatus similar to that shown in Figure 1. The whole apparatus is brought up to temperature by burning fuel in hot gas producer 2, following which this is gradually discontinued, solid reactants being simultaneously cut into reactor 1 by starting screw 13 while preheated air is added to line 3 from line 27 either directly by a bypass (not shown) or via hot gas producer 2. Under settled conditions, solid reactants are added to reactor 1 at a rate of about 6.35 pounds per minute while preheated air is added to line 3 at a rate of about 100 cubic feet per minute, measured at standard conditions. Temperatures are similar to those described in Example 1. Alkakli metal silicates are removed from lines 19 and line 22 at a total rate of about 4.35 pounds per minute.

Example 5

A mixture of siliceous material and sodium sulfate is prepared in the proportions specified in Example 2, the dried and pulverized mixture being placed in bin or hopper 4 of an apparatus similar to that shown in Figure 1. Producer gas containing 25% carbon monoxide and half as much hydrogen is passed to hot gas producer 2 by means of line 28 at a rate of 58 cubic feet per minute, measured at standard conditions. This producer gas is at a temperature of somewhat above 850° F. and preferably has a low content of solids. Air is introduced into the hot gas producer through line 27 at a rate of 38 cubic feet per minute, measured at standard conditions. The combustion that takes place in 2 soon brings the whole apparatus up to temperature, at which time screw 13 is started and the siliceous material-sodium sulfate mixture is added to the reactor 1 at a rate of about 4 pounds per minute. Product is removed from lines 19 and line 22 at a total rate of 3 pounds per minute. Temperatures are approximately as specified in Example 1.

To summarize and recapitulate, five modifications of the general method for the preparation of alkali metal silicates have been briefly described in the foregoing examples. These modifications may conveniently be divided into two general classes: (a) wherein the siliceous material is mixed with an alkali metal compound capable of reacting directly with siliceous material, with the formation of alkali metal silicates, as exemplified by Examples 1 and 3, and (b) wherein the siliceous material is mixed with an alkali metal compound that first must be reduced prior to reacting with the siliceous material, with the formation of alkali metal silicates, as exemplified by Examples 2, 4, and 5. In Example 1, a mixture of siliceous material and sodium carbonate is suspended in a stream of highly heated gas for a time sufficient for the formation of sodium silicate to occur. In Example 3, a similar mixture is incorporated with combustible matter and the whole is suspended in a moving stream of oxidizing gas. The oxidation of the combustible matter heats the whole to reaction temperature and sodium silicates form. In Example 2, a mixture of siliceous material, sodium sulfate and carbon is suspended in a moving stream of highly heated inert gas. Under the existing temperature conditions the sodium sulfate is reduced to the oxide, which in turn reacts with the siliceous material to form sodium silicates. Example 4 is similar except that an oxidizing gas is employed together with sufficient carbon to both raise the whole to reaction temperature and reduce sodium sulfate to the oxide. In Example 5, a mixture of siliceous material and sodium sulfate is suspended in a moving stream of gas having reducing properties, which converts sodium sulfate to the oxide.

While the instant invention has been elucidated by means of a showing and a description of an apparatus suitable for the accomplishment of the objects thereof and by the recital of numerous examples of various modifications thereof, it is to be understood that this apparatus and these examples are illustrative only and are included for the purpose of familiarizing those skilled in the art to which the instant invention pertains with the general scope thereof. Many modifications of the instant invention will readily occur to those skilled in the art to which it pertains.

While the use of carbonaceous material commonly known as petroleum coke or oil coke is described in Examples 2, 3 and 4, it is obvious that other suitable carbonaceous material may be used. Preferably such material should have a low ash content. Other suitable materials for the formation of carbonaceous matter in accord with the teachings of Examples 2 and 4 include molasses and coal tar pitches. Also, part or all of the carbonaceous matter may be added to the solid reactants in other forms and in other ways than as described in these two examples. For instance, in Example 3, instead of proceeding as described, a silica-sodium carbonate mixture may be prepared in the proportions outlined in Example 1 and in the same or similar manner and this may be mixed with about 8 pounds of carbon black, low ash coal, or the like per 100 pounds of mixture, and the whole charged to hopper or bin 4. Similarly, in Example 4, a silica-sodium sulfate-carbon mixture may be made using the proportions of Example 2, and to this may be added about 10 parts by weight of petroleum coke, carbon black, low ash coal, or the like per 100 parts of the silica-sodium carbonate-carbon, and the whole added, after mixing, to hopper or bin 4.

While diatomaceous earth has been specified as a siliceous material for use in the instant invention, numerous equivalents, for example quartz, quartzite, sand, and the like, will readily occur to those familiar with the art. It is advisable to employ the siliceous material selected in rather finely divided form, for example 40 mesh or less, to insure that the particles of alkali metal silicates formed are uniform in composition throughout. While sodium carbonate has been used in certain examples as illustrative of a material capable of reacting directly with siliceous material to form sodium silicates, many equivalents, such as sodium oxide, sodium peroxide, and sodium hydroxide, and salts capable of forming one of these when thermally decomposed, may be substituted therefor. Likewise equivalents for the sodium sulfate mentioned in some examples as illustrative of a compound that must be reduced prior to reaction with siliceous material will occur to those skilled in the art.

While in the examples sodium compounds have been cited exclusively, other alkali metal compounds may be substituted. While at present no uses requiring lithium, caesium or rubidium silicates are known, in a few minor applications the use of potassium silicates is almost essential, for example as binders in the manufacture of carbon arc electrodes when it is desired to eliminate the strong sodium lines. Also, since potassium silicates effloresce to a lesser extent than sodium silicates of corresponding composition, the former are commonly employed in silicate paints.

In the examples the siliceous material and sodium salt are so proportioned as to give silicates having a sodium oxide-silica ratio of 1:3.4, calculated on the mole basis. While this ratio is a very common one in commercial silicates, obviously the instant invention is not limited to the production of silicates of this ratio, this constant ratio being employed in the examples simply to facilitate comparisons between the various processes.

The manifold advantages of the instant invention are obvious. In the first place, the process is continuous and a simple apparatus is employed. The desired product is obtained in the form of fine solidified globules, which are brought into solution with extreme ease, especially after being pretreated in an atmosphere of steam. Furthermore, the life of the refractories employed is extremely long, due to the conducting of the reaction in the suspended phase, which reduces contact between reactants and refractories to a minimum. The long refractory life results in a twofold advantage. In the first place, furnace repairs and accordingly apparatus shut-downs are at a minimum and, secondly, contamination of the final product with materials from the refractories is at a minimum. This results in a final product that dissolves easily and completely to form a clear solution.

I claim:

1. In the manufacture of alkali metal silicates, the steps including, suspending particles comprising aggregates of an alkali metal compound and a siliceous material in a moving stream of heated gas wherein said particles are subjected to reaction conditions to effect the formation of molten particles of alkali metal silicates, cooling the resulting suspension to solidify said particles of alkali metal silicates and separating said solidified particles of alkali metal silicates from said gas stream.

2. In the manufacture of sodium silicates, the steps including, suspending particles comprising aggregates of sodium carbonate and siliceous material in a moving stream of heated gas wherein said particles are subjected to reaction conditions to effect the formation of molten particles of sodium silicates, cooling the resulting suspension to solidify said particles of sodium silicates and separating said solidified particles of sodium silicates from said gas stream.

3. In the manufacture of sodium silicates, the steps including, suspending particles comprising aggregates of sodium sulfate and a siliceous material in a moving stream of heated gas wherein said particles are subjected to reaction conditions to effect the formation of molten particles of sodium silicates, cooling the resulting suspension to solidfy said particles of sodium silicates and separating said particles of sodium silicates from said gas stream.

4. The process of claim 2, wherein said moving stream of gas is brought to reaction temperature by the combustion of carbonaceous material intimately mixed with said aggregates comprising sodium carbonate and a siliceous material.

5. The process of claim 3, wherein said moving stream of gas is brought to reaction temperature by the combustion of carbonaceous material intimately mixed with said aggregates comprising sodium sulfate and a siliceous material.

ROBERT F. RUTHRUFF.